Nov. 11, 1924.
A. BANK
CUP STAND
Filed May 18, 1923
1,515,539
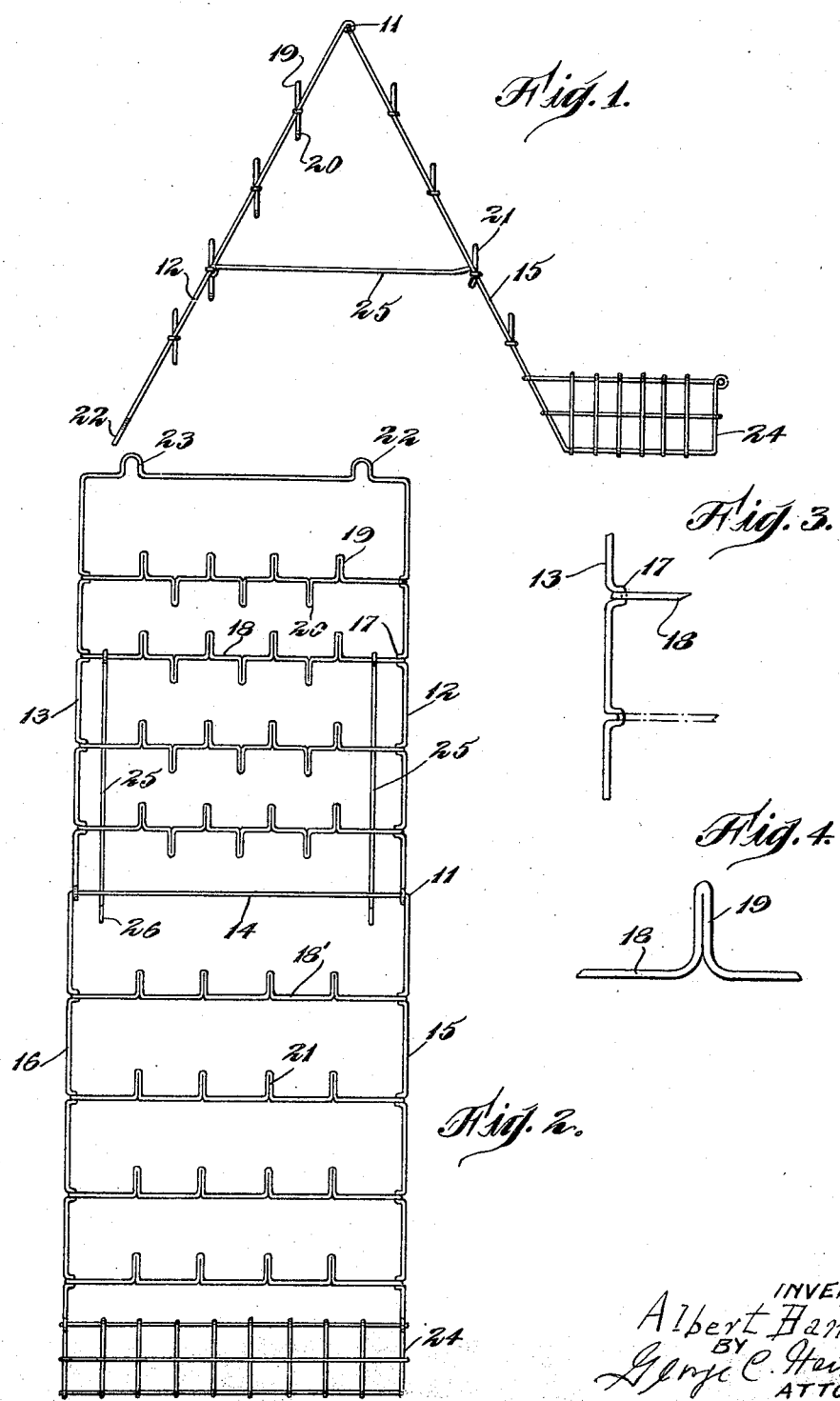
INVENTOR.
Albert Bank
BY
George C. Heim
ATTORNEY.

Patented Nov. 11, 1924.

1,515,539

UNITED STATES PATENT OFFICE.

ALBERT BANK, OF GLENAVON, SASKATCHEWAN, CANADA.

CUP STAND.

Application filed May 18, 1923. Serial No. 639,823.

*To all whom it may concern:*

Be it known that I, ALBERT BANK, a citizen of Poland, residing at Glenavon, Province of Saskatchewan, and Dominion of Canada, have invented certain new and useful Improvements in Cup Stands, of which the following is a specification.

This invention relates to improvements in kitchen articles, particularly in racks and especially in racks for cups or the like, and it is the principal object of my invention to provide a rack of this character which may either be placed on a table and other suitable support, or may be suspended from a wall.

Another object of my invention is the provision of a cup rack of simple and inexpensive construction from which the cups may be readily suspended by their handles.

A further object of the invention is the provision of a cup rack with which means are combined for catching cups or for holding saucers, spoons or the like.

These and other objects of my invention will become more fully apparent as the description thereof proceeds, and will then be more specifically pointed out in the appended claim.

In the accompanying drawing, forming a material part of this disclosure:

Figure 1 is a side elevation of the cup rack constructed according to the present invention adapted to be placed on a support.

Figure 2 is a front elevation of the rack when suspended from a wall.

Figure 3 is a side elevation of part of the frame bars, and

Figure 4 is a detail view of one of the prongs from which the cups are suspended by their handles.

The frame of the rack is preferably made in two parts of strong wire, which are hingedly connected as indicated at 11 by guiding the ends of the longitudinal bars 12 and 13 of one part around the cross-bar 14 of the other part connecting the longitudinal bars 15 and 16 of the latter.

Intermediate their ends the longitudinal bars 12, 13 and 15, 16 of the frame parts are bent inwardly to form open loops 17 into which the hooked ends of cross-bars 18, 18' are hooked.

The cross-bars 18 of one part of the frame are also made of strong wire formed intermediate their ends into a plurality of upwardly directed prongs 19 and downwardly directed prongs 20, while the cross-bars 18' of the other part of the frame, also made of strong wire, are formed intermediate their ends into a plurality of upstanding prongs 21.

The uppermost cross-bar 18 of one part of the frame is bent intermediate its ends to form loops 22, 23 by means of which the frame may be suspended from nails driven into a wall when the frame is used as illustrated in Figure 2, while they may act as feet when the frame is used as shown in Figure 1.

The lower ends of the longitudinal bars 15, 16 of the other part of the frame have attached thereto a basket 24 by guiding the side bars of the wire frame of the basket around bars 15 and 16.

Braces 25 are attached at their upper ends to one of the cross-bars 18 of one part and adapted to engage with their lower hooked ends 26 the corresponding cross-bar 18' of the other part of the frame.

The use of the device will be clear from the above description and need not further be explained, as it will be evident that the cups are suspended by their handles from the upstanding prongs, while saucers and spoons may be stored in the basket which will also tend to catch any cups which might inadvertantly be dropped during the act of suspending them from the prongs.

Changes may be made in the general arrangement and in the construction of the minor details thereof, without deviating from the scope and spirit of my invention.

What I claim as new and desire to secure by Letters Patent of the United States is—

A cup rack, comprising two independent skeleton frames connected at their ends for independent swinging movement, said frames including transverse bars formed with cup receiving projections, the projections on the transverse bars of one frame extending above and below the transverse bars, and brace rods carried by one frame and adapted to removably engage the other, whereby the frames may be held in relatively angular relation or through disconnection of the brace bars permitted to swing in substantial alignment for support from a wall, the double projections from the transverse bars of one frame providing upstanding cup receiving projections when said frame is in either operative relation to the other frame.

In testimony whereof I have affixed my signature.

ALBERT BANK.